United States Patent
Gutti et al.

(10) Patent No.: US 7,383,281 B1
(45) Date of Patent: Jun. 3, 2008

(54) MULTIVERSION DATABASE CLUSTER MANAGEMENT

(75) Inventors: Srinath Gutti, Fremont, CA (US); Ivan Pulleyn, Sunnyvale, CA (US)

(73) Assignee: Infoblox, Inc., Sunnyvale, CA (US)

( * ) Notice: Subject to any disclaimer, the term of this patent is extended or adjusted under 35 U.S.C. 154(b) by 391 days.

(21) Appl. No.: 10/950,184

(22) Filed: Sep. 24, 2004

(51) Int. Cl.
G06F 7/00 (2006.01)
(52) U.S. Cl. .................................... 707/103 R; 707/4
(58) Field of Classification Search .............. 707/1–5, 707/100, 103 R, 201–203
See application file for complete search history.

(56) References Cited

U.S. PATENT DOCUMENTS

| | | | |
|---|---|---|---|
| 5,201,046 A | | 4/1993 | Goldberg et al. |
| 5,202,982 A | * | 4/1993 | Gramlich et al. ............... 707/2 |
| 5,295,256 A | | 3/1994 | Bapat |
| 5,970,490 A | | 10/1999 | Morgenstern |
| 6,026,408 A | * | 2/2000 | Srinivasan et al. ...... 707/103 R |
| 6,073,140 A | * | 6/2000 | Morgan et al. ............. 707/203 |
| 6,154,747 A | | 11/2000 | Hunt |
| 6,260,042 B1 | | 7/2001 | Curbera et al. |
| 6,289,384 B1 | | 9/2001 | Whipple et al. |
| 6,298,354 B1 | * | 10/2001 | Saulpaugh et al. ...... 707/103 R |
| 6,457,021 B1 | * | 9/2002 | Berkowitz et al. .......... 707/201 |
| 6,499,037 B1 | * | 12/2002 | Breitbart et al. ........ 707/103 R |
| 6,549,901 B1 | * | 4/2003 | Loaiza et al. ................... 707/7 |
| 6,631,519 B1 | | 10/2003 | Nicholson et al. |
| 6,802,056 B1 | * | 10/2004 | Chaiken et al. ............. 717/136 |
| 6,804,677 B2 | * | 10/2004 | Shadmon et al. ........... 707/101 |
| 6,853,997 B2 | | 2/2005 | Wotring et al. |
| 7,043,716 B2 | | 5/2006 | Zimmer et al. |
| 2002/0169788 A1 | | 11/2002 | Lee et al. |
| 2003/0051226 A1 | | 3/2003 | Zimmer et al. |
| 2003/0140068 A1 | | 7/2003 | Yeung |
| 2003/0212698 A1 | | 11/2003 | Mani et al. |
| 2004/0064487 A1 | | 4/2004 | Nguyen et al. |
| 2004/0083218 A1 | * | 4/2004 | Feng .......................... 707/100 |
| 2004/0215752 A1 | * | 10/2004 | Satapati et al. ............. 709/223 |
| 2005/0021503 A1 | * | 1/2005 | Chiang .......................... 707/2 |
| 2005/0149582 A1 | * | 7/2005 | Wissmann et al. .......... 707/201 |
| 2005/0198630 A1 | * | 9/2005 | Tamma et al. .............. 717/175 |

OTHER PUBLICATIONS

Eppstein, David. "ICS 161: Design and Anaylsis of Algorithms Lecture notes for Feb. 8, 1996." Apr. 28, 1999. pp. 1-5. Retrieved on Jan. 9, 2007 from <http://www.ics.uci.edu/~eppstein/161/960208.html>.*
Eppstein, David. "ICS 161: Design and Analysis of Algorithms Lecture notes form Feb. 8, 1996." Apr. 28, 1999. pp. 1-5. Retrieved on Jan. 9, 2007 from <http://www.ics.uci.edu/~eppstein/161/960208.html>.*
U.S. Appl. No. 10/950,192, Gutti et al.
U.S. Appl. No. 10/950,364, Bailey et al.
U.S. Appl. No. 10/950,357, Bailey et al.
Grossman, Robert, et al., The Management and Mining of Multiple Predictive Models Using the Predictive Modeling Markup Language 1999, CiteSeer, whole document.
Bailey, S. et al., A High Performance Implementation of the Data Space Transfer Protocol (DSTP) Jun. 1999, ACM, whole document.

* cited by examiner

*Primary Examiner*—Wilson Lee
(74) *Attorney, Agent, or Firm*—Van Pelt, Yi & James LLP (57) ABSTRACT

A technique for propagating an update from a first database having a first version to a second database having a second version is disclosed. The technique includes receiving an update and the first version, determining a translation path, and translating the update to the second version.

48 Claims, 8 Drawing Sheets

MULTIVERSION DATABASE CLUSTER MANAGEMENT

CROSS REFERENCE TO OTHER APPLICATIONS

U.S. patent application Ser. No. 10/950,357 entitled MARKUP LANGUAGE SPECIFICATION OF A DATABASE SCHEMA is incorporated herein by reference for all purposes.

FIELD OF THE INVENTION

The present invention relates generally to data storage. More specifically, database migration is disclosed.

BACKGROUND OF THE INVENTION

Figure 1:
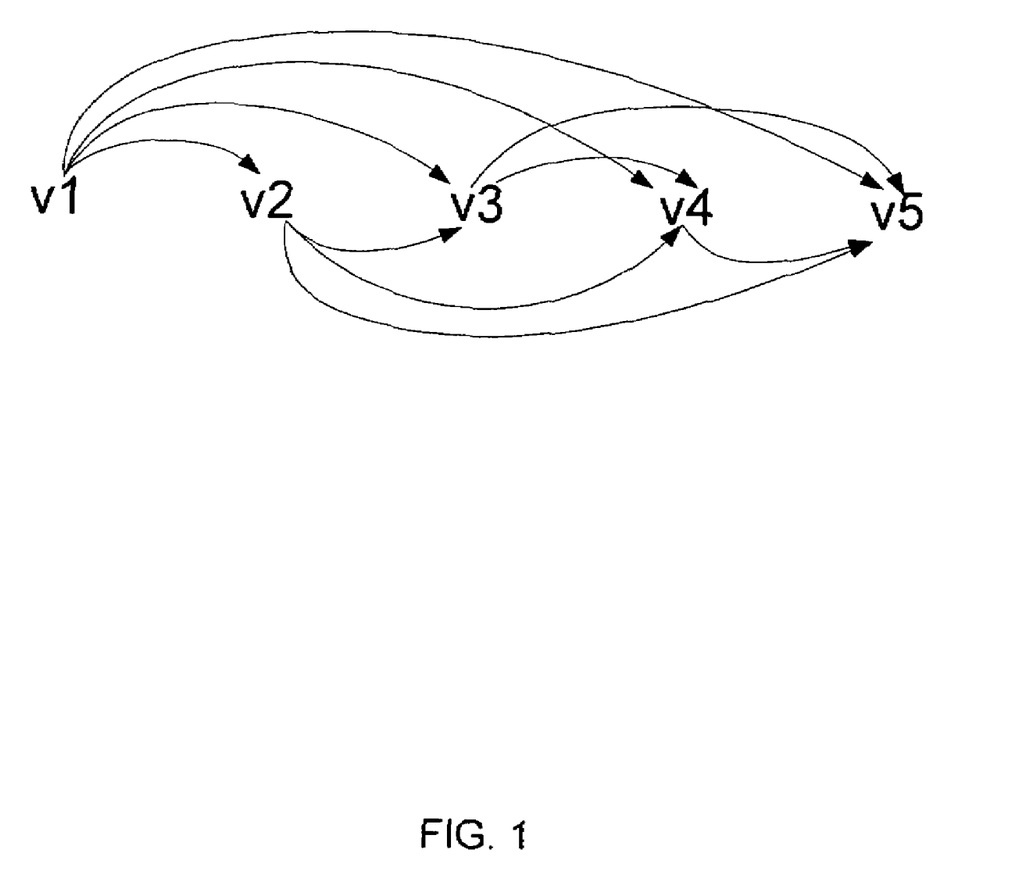
FIG. 1 is a diagram illustrating five versions of a database, v1 to v5.

A database schema describes the organization and structure of data in a database. Typically the schema of a database is modified incrementally with each new software release. FIG. 1 is a diagram illustrating five versions of a database, v1 to v5. For example, a first version (v1) of a customer database may include first name, last name, and SSN fields. In the next version (v2), a date of birth field may be added. As more versions are released, a customer site may end up with multiple databases each having different versions of software. Maintaining the logic to migrate the various existing versions to newer versions becomes increasingly difficult. For example, in FIG. 1, specific logic must be maintained to translate from v1 to v2, v1 to v3, v1 to v4, v1 to v5, v3 to v5, v2 to v3, v2 to v4, v4 to v5, and v2 to v5. In addition, it is difficult to express translations that span more than one version, such as a translation from v1 to v3. It would be desirable to have a simpler method for translating databases.

BRIEF DESCRIPTION OF THE DRAWINGS

Various embodiments of the invention are disclosed in the following detailed description and the accompanying drawings.

SUMMARY OF THE INVENTION

A technique for propagating an update from a first database having a first version to a second database having a second version is disclosed. An update to a data value in a first structure in the first database is received. In response to receiving the update to the data value, a translation path for updating the second database is determined. The translation path comprises a sequence of one or more translation steps for translating the update from the first version to the second version. The update is translated to the second version using the translation path so that the translated update can be applied to the second database.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Propagating an update from a first database having a first version to a second database having a second version is disclosed. An update and the first version are received, a translation path is determined, and the update is translated to the second version.

Figure 2:
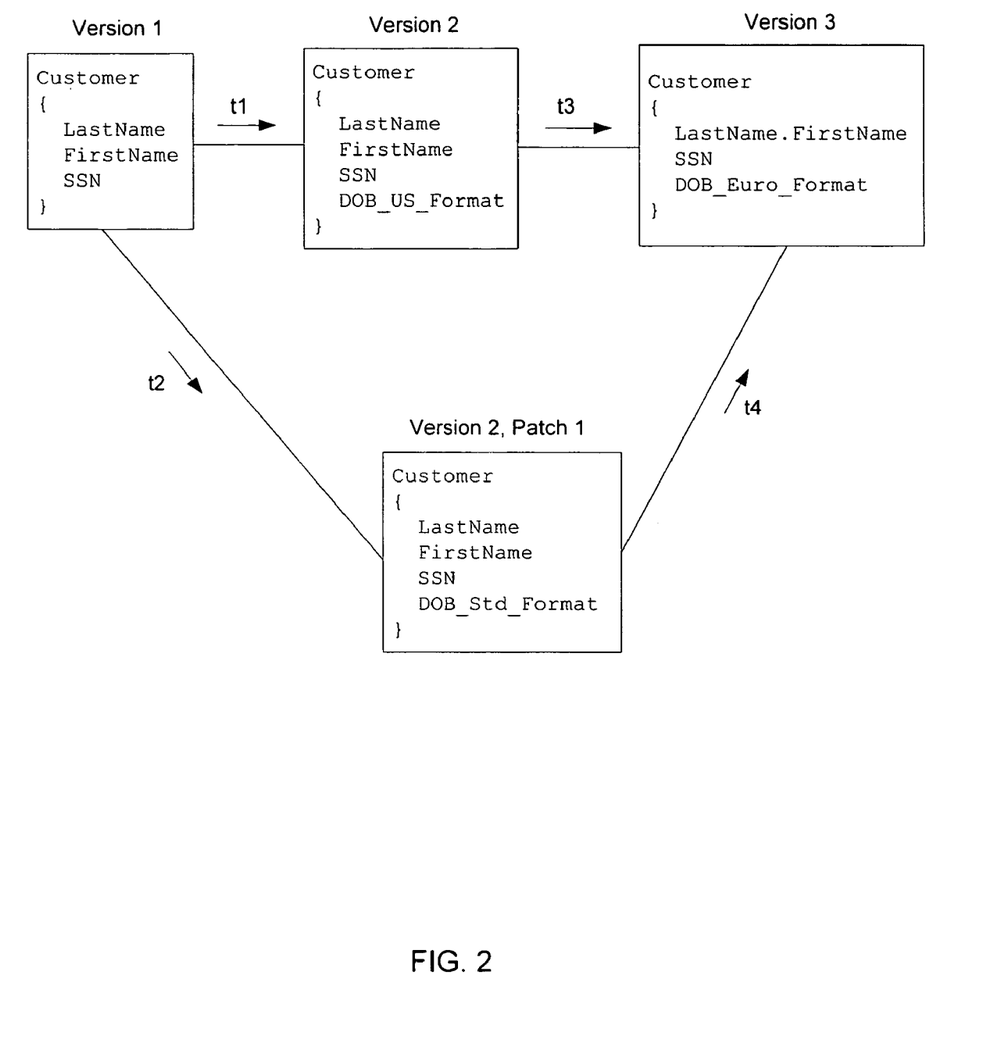
FIG. 2 is a diagram illustrating various versions of a database.

FIG. 2 is a diagram illustrating various versions of a database. In this example, Version 1 of the database includes a Customer object with three members: LastName, FirstName, and SSN. Version 2 of the database includes a customer object with four members: LastName, FirstName, SSN, and DOB_US_Format (i.e., month-date-year). Version 3 of the database includes a customer object with three members: LastName.FirstName, SSN, and DOB_Euro_Format (i.e., date-month-year). Version 2, patch 1 of the database includes a customer object with four members: LastName, FirstName, SSN, and DOB_Std_Format. Although objects are described in this example, any other appropriate data structures, such as tables or structures, may also be used. t1 represents the translation from version 1 to version 2. t1 includes a new member translation for the Customer object, where the new member is DOB_US_Format. t2 represents the translation from version 1 to version 2, patch 1. t2 includes a new member translation for the Customer object, where the new member is DOB_Std_Format. t3 represents the translation from version 2 to version 3. t3 includes two member value transform translations for the Customer object. The first member value transform concatenates LastName and FirstName. The second member value transform reformats DOB_US_Format to DOB_Euro_Format. t4 represents the translation from version 2, patch 1 to version 3. t4 includes two member value transform translations for the Customer object. The first member value transform concatenates LastName and FirstName. The second member value transform reformats DOB_Std_Format to DOB_Euro_Format. For example, to migrate a database from version 1 to version 3, either t1 and t3, or t2 and t4 can be applied. The translations are lossless and any available translation path can be taken. In one embodiment, each translation t1-t4 is expressed in a markup language such as XML, as more fully described below.

The following is an example of an XML description of a database (Example 1):

```
<database version="2.0.0_R18"/>
    <object>
        <property name="name" value="127.0.0.1"/>
        <property name="_type" value=".com.infoblox.one.node"/>
        <property name="first_name" value="John"/>
        <property name="last_name" value="Doe"/>
    </object>
    <object>
        <property name="name" value="com"/>
        <property name="_type" value=".com.infoblox.one.zone"/>
    </object>
    .
    .
    .
</database>
```

In this example, the specification describes version 2.0.0_R18 of a database. The database includes a plurality of objects. Each object includes one or more members, where a member includes a name value pair. For example, the first object has four members: name "127.0.0.1", type ".com.infoblox.one.node", first_name "John", and last_name "Doe". The first object is a node object. The second object has two members: name "com" and type ".com.infoblox.one.zone". The second object is a zone object. Any number of objects can be specified. In one embodiment, the XML description of the database used is RTXML, a markup language described in U.S. patent application Ser. No. 10/950,357, which is incorporated herein by reference above.

The following is an example of a Migration Description XML (MDXML) specification of a translation (Example 2):

```
<STRUCTURE-TRANSFORM STRUCT-NAME=
".com.infoblox.one.node">
    <MEMBER-NAME-CHANGE PRE-XFORM-VALUE=
"name" POST-XFORM-VALUE="node_name"/>
    <MEMBER-VALUE-CHANGE MEMBER-NAME=
"name" PRE-XFORM-VALUE="127.0.0.1" POST-XFORM-VALUE=
"192.168.1.2"/>
    <MEMBER-VALUE-CHANGE MEMBER-NAME=
"name" PRE-XFORM-VALUE="127.0.0.2" POST-XFORM-VALUE=
"192.168.1.3"/>
    <NEW-MEMBER MEMBER="DOB" DEFAULT-VALUE=
"Jan 1, 1970"
    <MEMBER-VALUE-XFORM>
        <concat>
            <first_name>
            <last_name>
        </concat>
        <destination full_name/>
    </MEMBER-VALUE-XFORM>
</STRUCTURE-TRANSFORM>
```

For example, MDXML may be used to describe a translation such as t1, t2, t3, or t4. In this example, the translation to be applied to structures of type ".com.infoblox.one.node" is specified. The translation may include a set of translations (or transforms), such as the following:

MEMBER-NAME-CHANGE changes the name of a member. For example, if the name of the structure was previously "name", it would be changed to "node_name".

MEMBER-VALUE-CHANGE changes the value of a member. For example, if the value of the name of the structure was previously "127.0.0.1", it would be changed to "192.168.1.2".

NEW-MEMBER adds a new member to the structure. For example, a new member with name "DOB" and value "Jan. 1, 1970" would be created in the structure.

MEMBER-VALUE-XFORM transforms the value of a member. For example, first_name and last_name values would be transformed according to the concat tag, where the concat tag could indicate a concatenation of the first_name and last_name values.

Other types of translations may also be specified for objects of type ".com.infoblox.one.node". Translations for other types of objects may also be specified.

The following is an example of an XML description of a database after the translation shown in Example 2 is applied to the database shown in Example 1 (Example 3):

```
<database version="2.0.0_R19"/>
    <object>
        <property name="node_name" value="192.168.1.2"/>
        <property name="_type" value=".com.infoblox.one.node"/>
        <property name="dob" value="Jan 1, 1970"/>
        <property name="full_name" value="John.Doe"/>
    </object>
    <object>
        <property name="name" value="com"/>
        <property name="_type" value=".com.infoblox.one.zone"/>
    </object>
    .
    .
    .
</database>
```

As shown, "node" has become "node_name". The member with name "_type" is unchanged. "dob" is a new member. "full_name" is a new member whose value is the concatenation of the first_name and last_name values. The zone object is the same, since there were no translations described for the zone object in the MDXML translation shown in Example 2.

Figure 3:
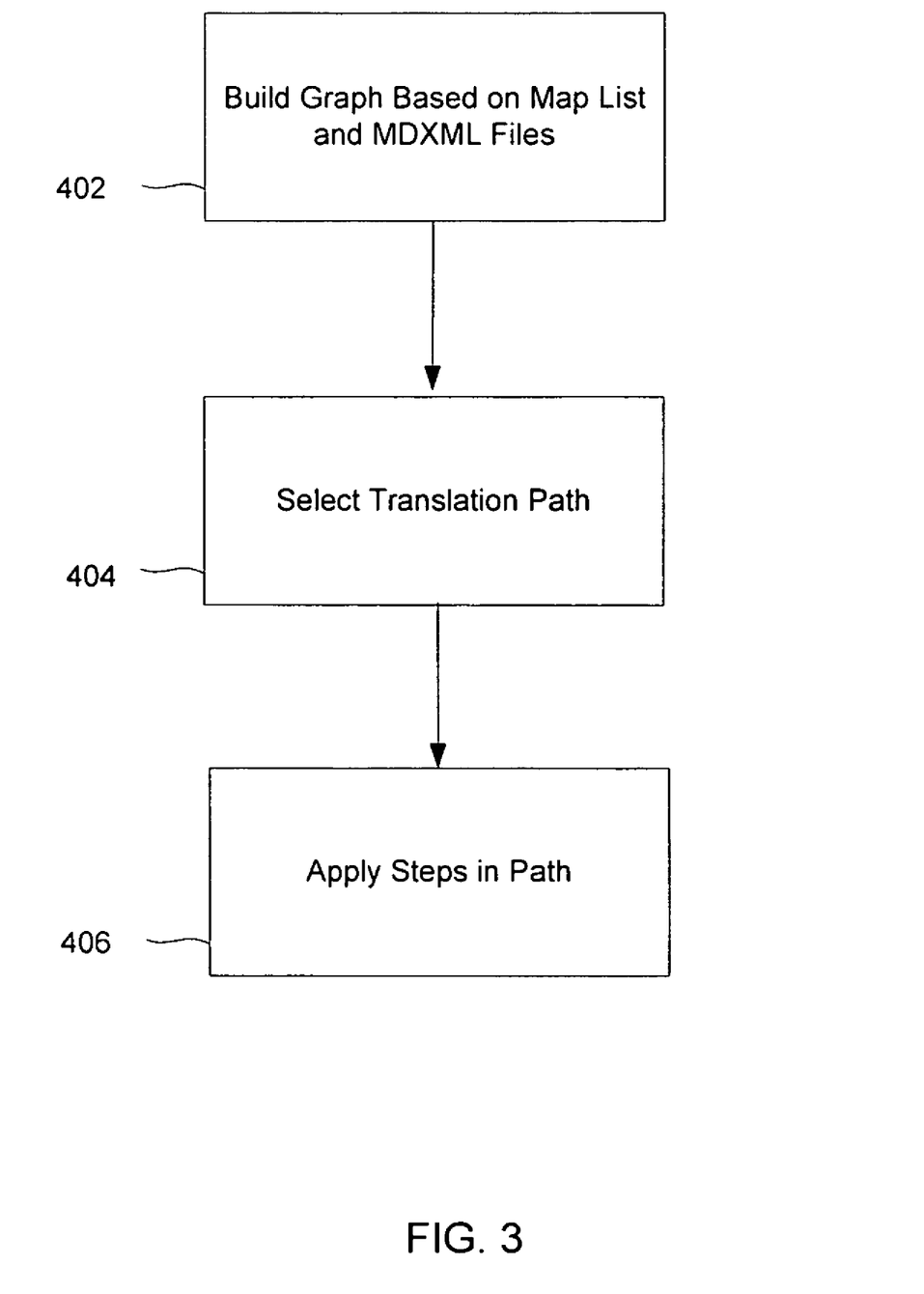
FIG. 3 is a flowchart illustrating a method of converting a database from a first version to a second version.

FIG. 3 is a flowchart illustrating a method of converting a database from a first version to a second version. In this example, a graph is built based on a map list and MDXML files (402). The following is an example of a map list (Example 4):

```
<rtxml-version-map-list>
    <RTXML-VERSION-MAP version="2.0.0-R18"
md5="2bf689e0aa69ab0663147908250cacc0"/>
    <RTXML-VERSION-MAP version="2.0.0-R19"
md5="79fcd96045cb43147845d8336892a835"/>
</rtxml-version-map-list>
```

Figure 4:
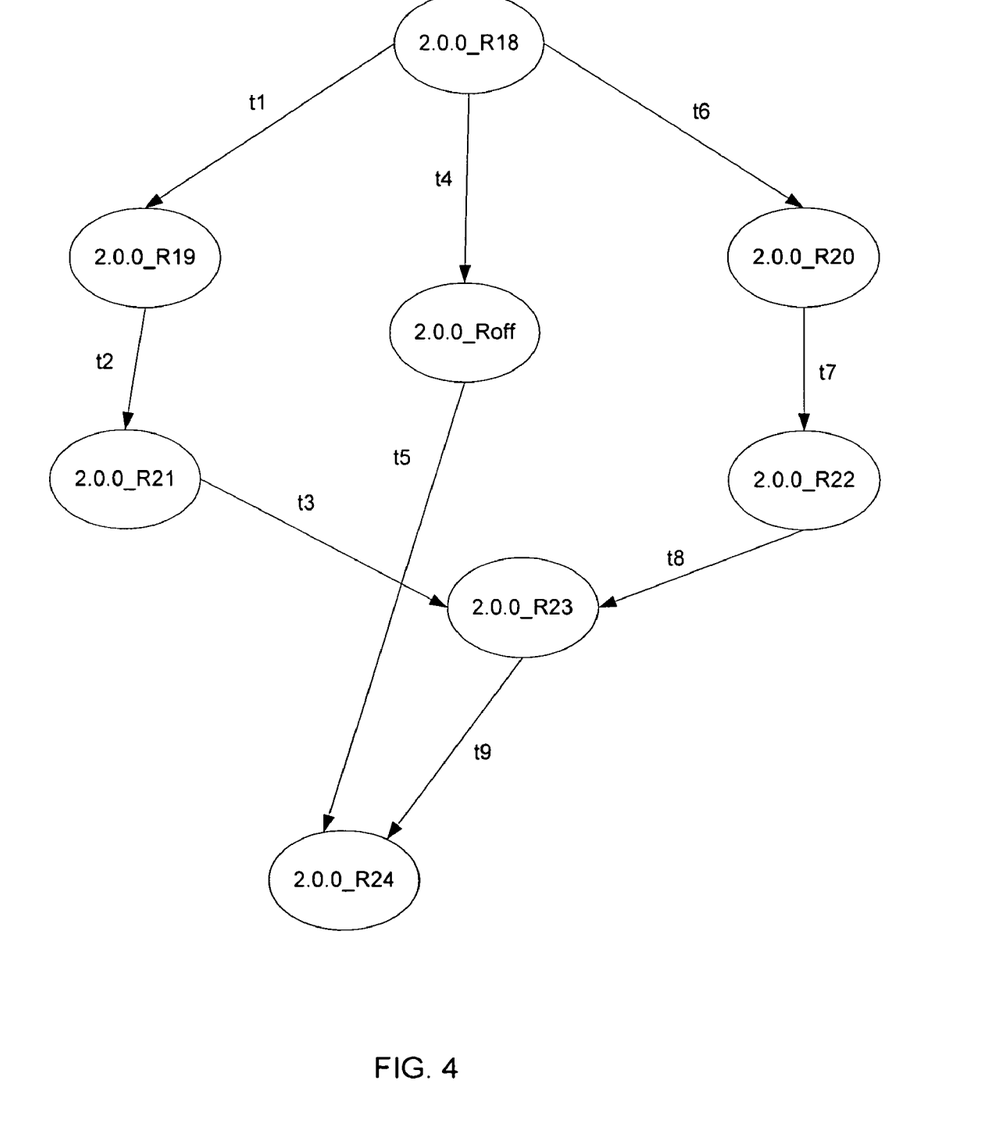
FIG. 4 is a diagram of a translation graph.

The map list uniquely maps a content based key to a database version. In one embodiment, the content based key is a hash value, such as an MD5 sum, of the database schema. In the example shown, the first mapping is from version "2.0.0-R18" to key "2bf689e0aa69ab0663147908250cacc0". The key was obtained by taking a hash of the version "2.0.0-R18" database schema. Using the map list, the database version can be determined and the appropriate translation graph can be constructed. FIG. 4 is a diagram of a translation graph. A translation graph describes the available paths that may be used to translate a database from one version to another version. In this example, the translation graph shows the available paths that may be used to translate a database from version "2.0.0_R18" to version "2.0.0_R24". ("2.0.0_Roff" might be a special release created for a particular customer.) For example, translations t1, t2, t3, t9, translations t4, t5, or translations t6, t7, t8, t9 may be applied to translate the database from version 2.0.0_R18 to version 2.0.0_R24. In one embodiment, for each translation step t1-t9, there is an MDXML file that describes the translation. Thus, if there is an MDXML file available for a particular translation, that translation is available for use as a step in a translation path.

Returning to FIG. 3, a translation path is selected (404). For example, the shortest path (e.g., t4, t5) or the first path found (e.g., t1, t2, t3, t9) may be selected. The appropriate translation steps in the path are applied to the database (406). For example, if the shortest path was selected in step 404, the MDXML file for t4 and the MDXML file for t5 would be used to translate the database, as more fully described below.

Figure 5:
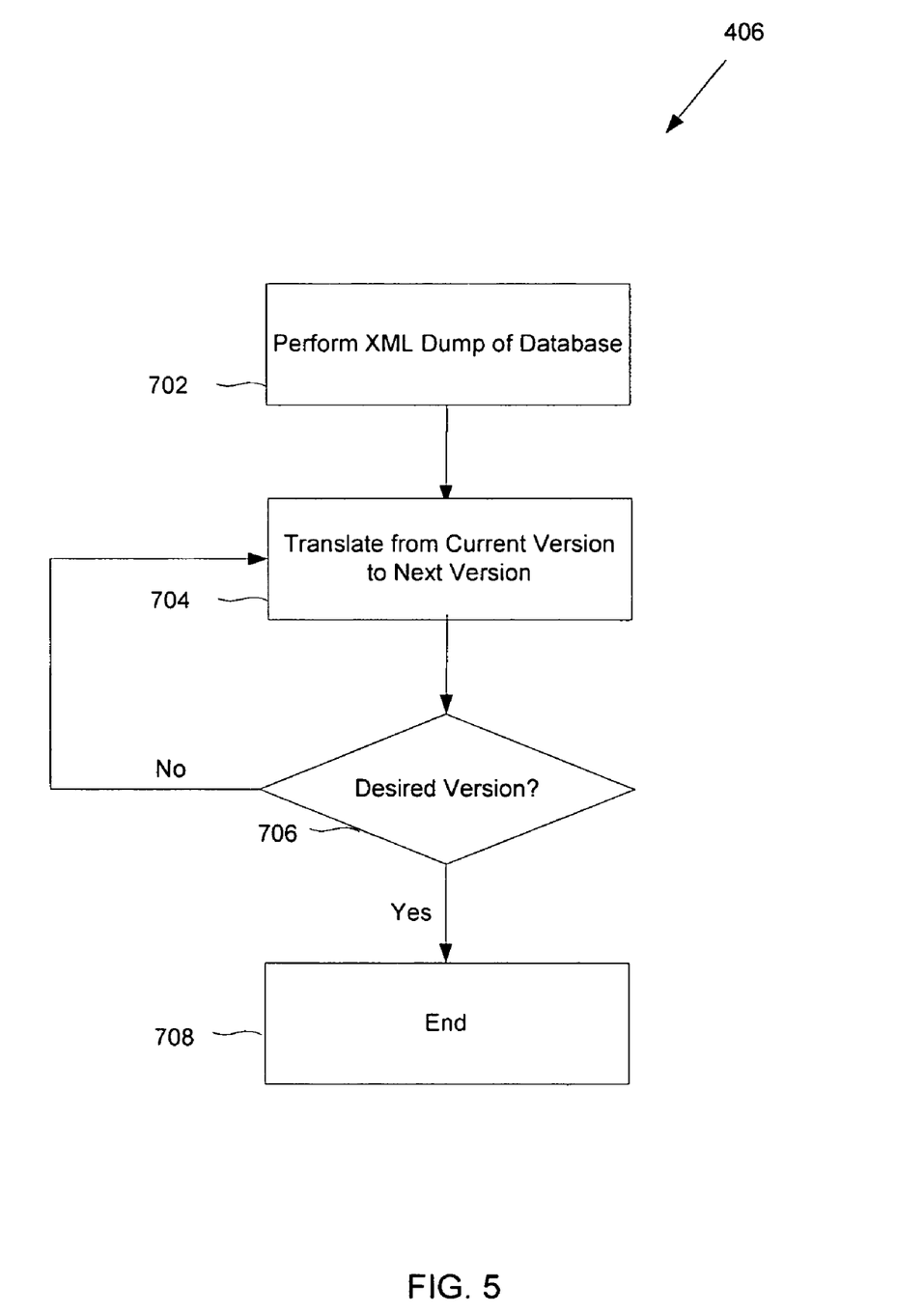
FIG. 5 is a flowchart illustrating a method of applying translation steps to arrive at a desired database version.

FIG. 5 is a flowchart illustrating a method of applying translation steps to arrive at a desired database version. In one embodiment, this method is used to perform step 406 of FIG. 3. In this example, an XML dump of the database is performed (702). For example, the database could be a relational, object-oriented, or any other type of database. That database would be dumped into an XML file, e.g., formatted similarly to the file shown in Example 1. In one embodiment, the database is already described in XML. The database is translated from the current version to the next version (704) using the appropriate MDXML file. In one embodiment, the MDXML file is parsed into in memory structures based on the type of structure, e.g., there is one in memory structure describing the translations for each type of structure. It is determined whether the database version is the desired version (706). If the database version is the desired version, the process ends (708). If the database version is not the desired database version, the process returns to step 704 in which the database is translated from the current version to the next version using the appropriate MDXML file. For example, if the next step is to perform translation t2 in FIG. 4, "t2.mdxml" is used. In this example, the database is translated from one version to another incrementally, i.e., the database is translated one version at a time until the desired version is reached. In one embodiment, each time a new database version is released, an MDXML file is released to describe the incremental translation from the previous version.

Figure 6:
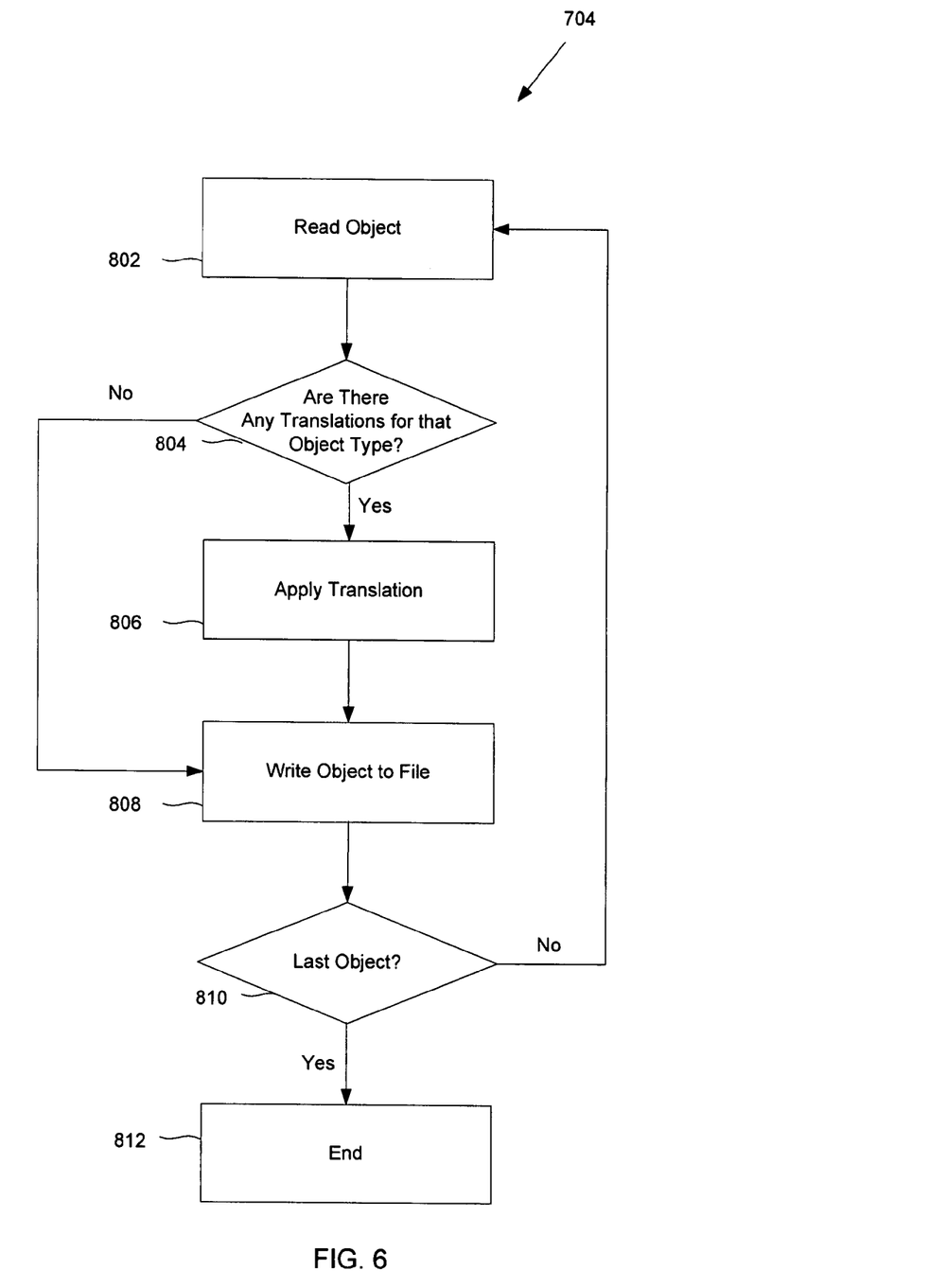
FIG. 6 is a flowchart illustrating a method of translating a database from one version to the next version.

FIG. 6 is a flowchart illustrating a method of translating a database from one version to the next version. In one embodiment, this process is used to perform step 704 of FIG. 5. In this example, the first object is read (802). In one embodiment, the first object in an XML file representing a database is read. For example, returning to Example 1, the first object read would be the node object with name "127.0.0.1" and type ".com.infoblox.one.node". It is determined whether there are any translations for that object type. For example, if the object is a node object, it is determined whether there are any translations for the node object. In some embodiments, the in memory structures of the MDXML file parsed in step 704 are consulted for translations corresponding to the object. For example, if the MDXML file looked like Example 2, it would be determined that there are translations for the node object, as the structure transform shown is for an object (or structure) of type node (".com.infoblox.one.node"). If it is determined that there are translation(s) for that object type, the translation is applied to the object (806). For example, if the structure transform for objects of type node shown in Example 2 is applied to the node object shown in Example 1, the resulting object would look like the node structure shown in Example 3. The resulting object is written to a file (808), e.g., tmp.xml. It is determined whether the object is the last object in the database XML file (810). If the object is the last object, the process ends (812). If the object is not the last object, the process returns to step 802 and the next object is read. Returning to step 804, if there are no translations for that object type, the object is written to the file (808) and the process continues as described above. The resulting file (e.g., tmp.xml) is the XML file associated with the translated database. The resulting file may be used to generate the new database, such as an object oriented or relational database. In some embodiments, rather than translating one object at a time, objects are translated in groups.

In addition to database migration, the system and methods described herein may also be used for other purposes. For example, in one embodiment the techniques described above are used to manage a database cluster having multiple versions of a database.

Figure 7:
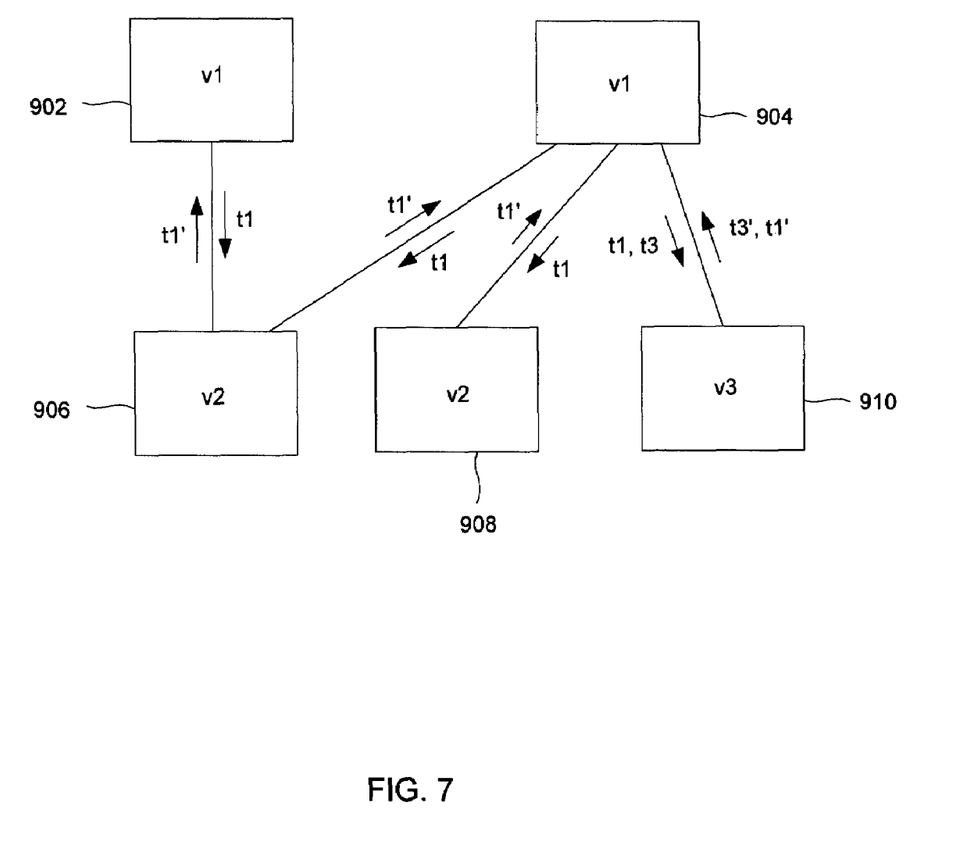
FIG. 7 is a block diagram illustrating a system used in one embodiment to manage a database cluster having multiple database versions.

FIG. 7 is a block diagram illustrating a system used in one embodiment to manage a database cluster having multiple database versions. In this example, the system includes five databases 902-910. Databases 902 and 904 have version 1 software. Databases 906 and 908 have version 2 software, and database 910 has version 3 software. Such a scenario, in which multiple database versions exist within a cluster, can occur during a system upgrade process. For example, rather than upgrading all the databases to the latest version at once, the databases may be migrated one at a time. In one embodiment, databases 902-910 serve as backups of each other. If one database fails, there are four remaining backup databases that are available. All the databases would need to fail before the cluster failed. If any one of databases 902-910 is updated, the other databases would also need to be updated.

t1 represents the translation from version 1 to version 2. t1' represents the translation from version 2 to version 1. t3 represents the translation from version 2 to version 3. t3' represents the translation from version 3 to version 2. For example, an update sent from database 902 to database 906 would be translated using t1. An update from sent from database 906 to database 904 would be translated using t1'. An update sent from database 904 to database 908 would be translated using t1. An update sent from database 904 to database 910 would be translated using t1 and t3. Each of translations t1, t1', t3, and t3' may be described by an XML file, such as an MDXML file.

Figure 8:
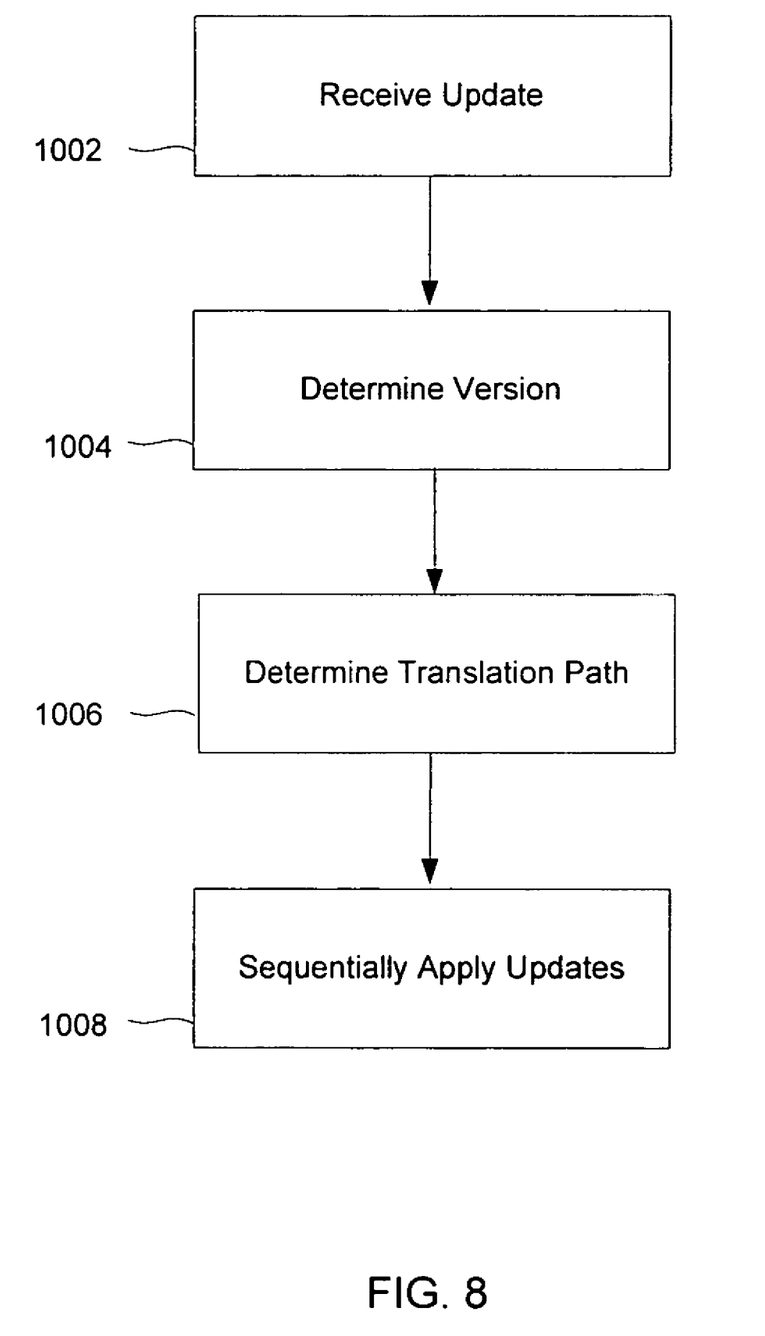
FIG. 8 is a flowchart illustrating a method of propagating an update from a first database to a second database with a different version.

FIG. 8 is a flowchart illustrating a method of propagating an update from a first database to a second database with a different version. In this example, an update is received (1002). For example, an update is received at database 902 in FIG. 7. The update could be any write request, such as update, delete, or insert. The version of the database is determined (1004). For example, a content based key, such as a hash value, is generated based on the first database schema. A map list can be consulted to determine the version of the database from the content based key, as described above. A translation path is determined (1006). In one embodiment, a translation graph is consulted to determine the translation path. For example, to propagate an update from database 904 (version 1) to database 910 (version 3), there may be two available translation paths: t1, t3 or t2, t4. The translation path may be determined based on any appropriate criteria, such as the shortest path or the first path found. The translation path may be predetermined. For example, translation path t1, t3 may be the predetermined path; that is, when an update is received at database 910, translation path t1, t3 is automatically used to translate the update. In some embodiments, the translation occurs at database 904. For example, a translation from v2 to v1 may occur at database 904. The updates are sequentially applied (1008). For example, t1 is applied followed by t3 if translation path t1, t3 is selected. Similarly, the update could be propagated to the other databases in the cluster.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method of propagating an update from a first database having a first version to a second database having a second version, including:
   receiving an update to a value in a first data structure in the first database;
   determining a translation path for updating the second database, wherein the translation path comprises a sequence of two or more translation steps for translating the update from the first version to the second version; and
   translating the update to the second version using the translation path so that the translated update can be applied to the second database;
   wherein the sequence of translation steps includes a first translation step and a second translation step and wherein translating includes:
   executing the first translation step to translate the update from the first version of the database to a third version of the database; and
   executing the second translation step to translate the update from the third version of the database to the second version of the database.

2. The method as recited in claim 1, wherein the first version is determined using a content based key associated with the first database.

3. The method as recited in claim 1, wherein the first version is a hash value associated with the first database.

4. The method as recited in claim 1, wherein the first database and the second database are in a database cluster.

5. The method as recited in claim 1, wherein translating includes executing steps in the translation path.

6. The method as recited in claim 1, further including building a translation graph.

7. The method as recited in claim 1, wherein the path is the shortest path in a translation graph.

8. The method as recited in claim 1, wherein determining the translation path is based on a content based key associated with the first version and a content based key associated with the second version.

9. The method as recited in claim 1, wherein determining the translation path is based on a hash value associated with the first version and a hash value associated with the second version.

10. The method as recited in claim 1, wherein translating includes processing a markup language representation of each translation step.

11. The method as recited in claim 1, wherein translating includes processing an XML representation of each translation step.

12. The method as recited in claim 1, wherein each translation step translates the database to another version of the database.

13. The method as recited in claim 1, wherein translating includes executing translations steps, wherein each translation step translates the database to another version of the database.

14. The method as recited in claim 1, wherein translating includes applying a translation of type name change, value change, new member, or value transform.

15. A system for propagating an update from a first database having a first version to a second database having a second version, including:
   a processor configured to: receive an update to a value in a first data structure in the first database;
   determine a translation path for updating the second database, wherein the translation path comprises a sequence of one or more translation steps for translating the update from the first version to the second version; and
   translate the update to the second version using the translation path so that the translated update can be applied to the second database;
   wherein the sequence of translation steps includes a first translation step and a second translation step and wherein translating includes:
   executing the first translation step to translate the update from the first version of the database to a third version of the database; and
   executing the second translation step to translate the update from the third version of the database to the second version of the database; and
   a memory that is coupled with the processor, wherein the memory provides the processor with computer-executable instructions.

16. The system as recited in claim 15, wherein the first version is a content based key associated with the first database.

17. The system as recited in claim 15, wherein the first version is a hash value associated with the first database.

18. The system as recited in claim 15, wherein the first database and the second database are in a database cluster.

19. The system as recited in claim 15, wherein translate includes execute steps in the translation path.

20. The system as recited in claim 15, wherein the processor is further configured to building a translation graph.

21. The system as recited in claim 15, wherein the path is the shortest path in a translation graph.

22. The system as recited in claim 15, wherein the translation path is determined based on a content based key associated with the first version and a content based key associated with the second version.

23. The system as recited in claim 15, wherein the translation path is determined based on a hash value associated with the first version and a hash value associated with the second version.

24. The system as recited in claim 15, wherein translate includes process a markup language representation of each translation step.

25. The system as recited in claim 15, wherein translate includes process an XML representation of each translation step.

26. The system as recited in claim 15, wherein each translation step translates the database to another version of the database.

27. The system as recited in claim 15, wherein translate includes execute translations steps, wherein each translation step translates the database to another version of the database.

28. The system as recited in claim 15, wherein translate includes apply a translation of type name change, value change, new member, or value transform.

29. A computer program product for propagating an update from a first database having a first version to a second database having a second version, the computer program product being embodied in a computer readable storage medium and comprising computer-executable instructions for:
receiving an update to a value in a first data structure in the first database;
determining a translation path for updating the second database, wherein the translation path comprises a sequence of one or more translation steps for translating the update from the first version to the second version; and
translating the update to the second version using the translation path so that the translated update can be applied to the second database;
wherein the sequence of translation steps includes a first translation step and a second translation step and wherein translating includes:
executing the first translation step to translate the update from the first version of the database to a third version of the database; and
executing the second translation step to translate the update from the third version of the database to the second version of the database.

30. The computer program product as recited in claim 29, wherein the first version is a content based key associated with the first database.

31. The computer program product as recited in claim 29, wherein the first version is a hash value associated with the first database.

32. The computer program product as recited in claim 29, wherein the first database and the second database are in a database cluster.

33. The computer program product as recited in claim 29, wherein translating includes executing steps in the translation path.

34. The computer program product as recited in claim 29, the computer program product further comprising computer instructions for building a translation graph.

35. The computer program product as recited in claim 29, wherein the path is the shortest path in a translation graph.

36. The computer program product as recited in claim 29, wherein determining the translation path is based on a content based key associated with the first version and a content based key associated with the second version.

37. The computer program product as recited in claim 29, wherein determining the translation path is based on a hash value associated with the first version and a hash value associated with the second version.

38. The computer program product as recited in claim 29, wherein translating includes processing a markup language representation of each translation step.

39. The computer program product as recited in claim 29, wherein translating includes processing an XML representation of each translation step.

40. The computer program product as recited in claim 29, wherein each translation step translates the database to another version of the database.

41. The computer program product as recited in claim 29, wherein translating includes executing translations steps, wherein each translation step translates the database to another version of the database.

42. The computer program product as recited in claim 29, wherein translating includes applying a translation of type name change, value change, new member, or value transform.

43. The method as recited in claim 1, wherein the first data structure is an existing data structure in the first database.

44. The method as recited in claim 1, wherein the translation steps include creating a new data structure in the second database that corresponds to the first data structure.

45. The system as recited in claim 15, wherein the first data structure is an existing data structure in the first database.

46. The system as recited in claim 15, wherein the translation steps include creating a new data structure in the second database that corresponds to the first data structure.

47. The computer program product as recited in claim 29, wherein the first data structure is an existing data structure in the first database.

48. The computer program product as recited in claim 29, wherein the translation steps include creating a new data structure in the second database that corresponds to the first data structure.

* * * * *